United States Patent [19]

Sato

[11] Patent Number: 5,059,157

[45] Date of Patent: Oct. 22, 1991

[54] SYSTEM FOR CONTROLLING A CONTINUOUSLY VARIABLE TRANSMISSION HAVING A TORQUE CONVERTER

[75] Inventor: Keiji Sato, Tokyo, Japan

[73] Assignee: Fuji Jukogyo Kabushiki Kaisha, Tokyo, Japan

[21] Appl. No.: 608,574

[22] Filed: Nov. 2, 1990

[30] Foreign Application Priority Data

Nov. 30, 1989 [JP] Japan ................... 1-311609

[51] Int. Cl.$^5$ ............................ F16H 59/00
[52] U.S. Cl. ........................ 474/18; 474/28
[58] Field of Search ............ 474/8, 11, 12, 17, 18, 474/28, 69, 70; 74/866-868

[56] References Cited

U.S. PATENT DOCUMENTS 4,781,655 11/1988 Tezuka .................... 474/28
4,850,935 7/1989 Morimoto ................ 474/18
4,923,433 5/1990 Tanaka et al. ........ 474/28 X

FOREIGN PATENT DOCUMENTS 63-303259 12/1988 Japan .

Primary Examiner—Thuy M. Bui
Attorney, Agent, or Firm—Martin A. Farber

[57] ABSTRACT

A continuously variable belt drive transmission has a torque converter with a lockup clutch. The lockup clutch is engaged in accordance with conditions of an engine and the transmission. Torque of the torque converter is estimated based on engine operating conditions and transmission conditions, and torque of the lockup clutch is estimated based on engine operating conditions and detected transmission conditions. The estimated converter torque and the estimated clutch torque are compared with each other for determining larger torque. The lockup clutch is disengaged when the estimated converter torque is larger than the estimated lockup clutch torque.

3 Claims, 5 Drawing Sheets

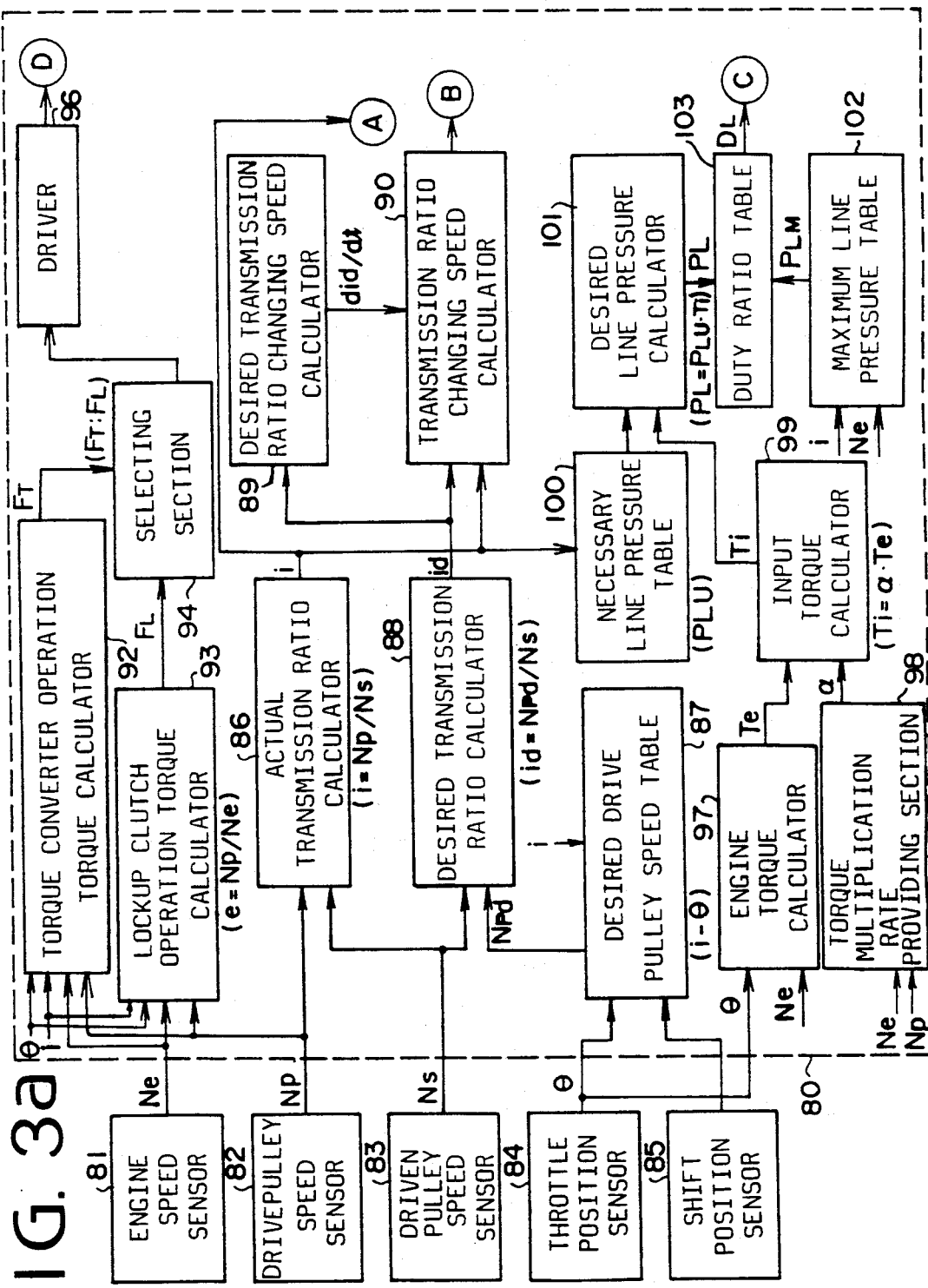

SYSTEM FOR CONTROLLING A CONTINUOUSLY VARIABLE TRANSMISSION HAVING A TORQUE CONVERTER

BACKGROUND OF THE INVENTION

The present invention relates to a hydraulic control system for a continuously variable belt-drive automatic transmission for a motor vehicle having a torque converter, and more particularly to an open-loop control system for controlling a lockup clutch of the torque converter.

A continuously variable transmission having the torque converter with the lockup clutch is known. The torque converter operates to multiply torque of an engine, so that the vehicle can be smoothly started. After the start of the vehicle, the torque converter is preferably locked up by a lockup system, thereby preventing a loss of power and improving fuel consumption. Thus, various control systems for controlling the lockup clutch have been proposed in order to effectively use such characteristics.

However, when the continuously variable transmission (CVT) is provided on the vehicle, the transmission ratio changes continuously and inertia mass of pulleys is large. Therefore, it is not always preferable to lockup the clutch after the start of the vehicle in consideration of operation torque of the lockup clutch. Namely, it is desirable to use torque multiplication effect of the torque converter under certain driving conditions, such as at acceleration of the vehicle, even after the start of the vehicle.

Japanese Patent Application Laid-Open 63-303259 discloses a control system of the lockup clutch where the clutch is locked as soon as a transmission ratio of a CVT starts to change. That is, in the system, the torque converter is operated only at the start of the vehicle before the transmission ratio changes.

SUMMARY OF THE INVENTION

The object of the present invention is to provide a system for controlling a continuously variable transmission having a torque converter where the torque converter is operated or a lockup clutch is engaged in dependency on driving conditions so as to provide an optimum torque for various driving conditions, thereby improving driving performance and decreasing fuel consumption of a motor vehicle.

According to the present invention, there is provided a system for controlling a belt drive continuously variable transmission for transmitting power of an engine to wheels of a motor vehicle, the system having a hydraulic circuit including a transmission ratio control valve, and the transmission having a torque converter with a lockup clutch.

The system comprises first detector means for detecting engine operating conditions, second detector means for detecting condition of the transmission, the transmission ratio control valve being provided to be operated in accordance with detected operating conditions of the engine and detected conditions of the transmission for controlling the transmission ratio, torque converter torque estimating means for estimating torque of the torque converter based on the engine operating conditions and the detected transmission conditions, lockup clutch torque estimating means for estimating the torque of the lockup clutch based on the detected engine operating conditions and the detected transmission conditions, comparator means for comparing the estimated converter torque and the estimated clutch torque with each other and for determining larger torque. The lockup clutch is disengaged when the comparator means determines that the estimated converter torque is larger than the estimated lockup clutch torque.

The other objects and features of this invention will become understood from the following description with reference to the accompanying drawings.

BRIEF DESCRIPTION OF THE DRAWINGS

FIGS. 3a and 3b show a block diagram of a control unit of the present invention.

DETAILED DESCRIPTION OF THE PREFERRED EMBODIMENTS

Figure 1:
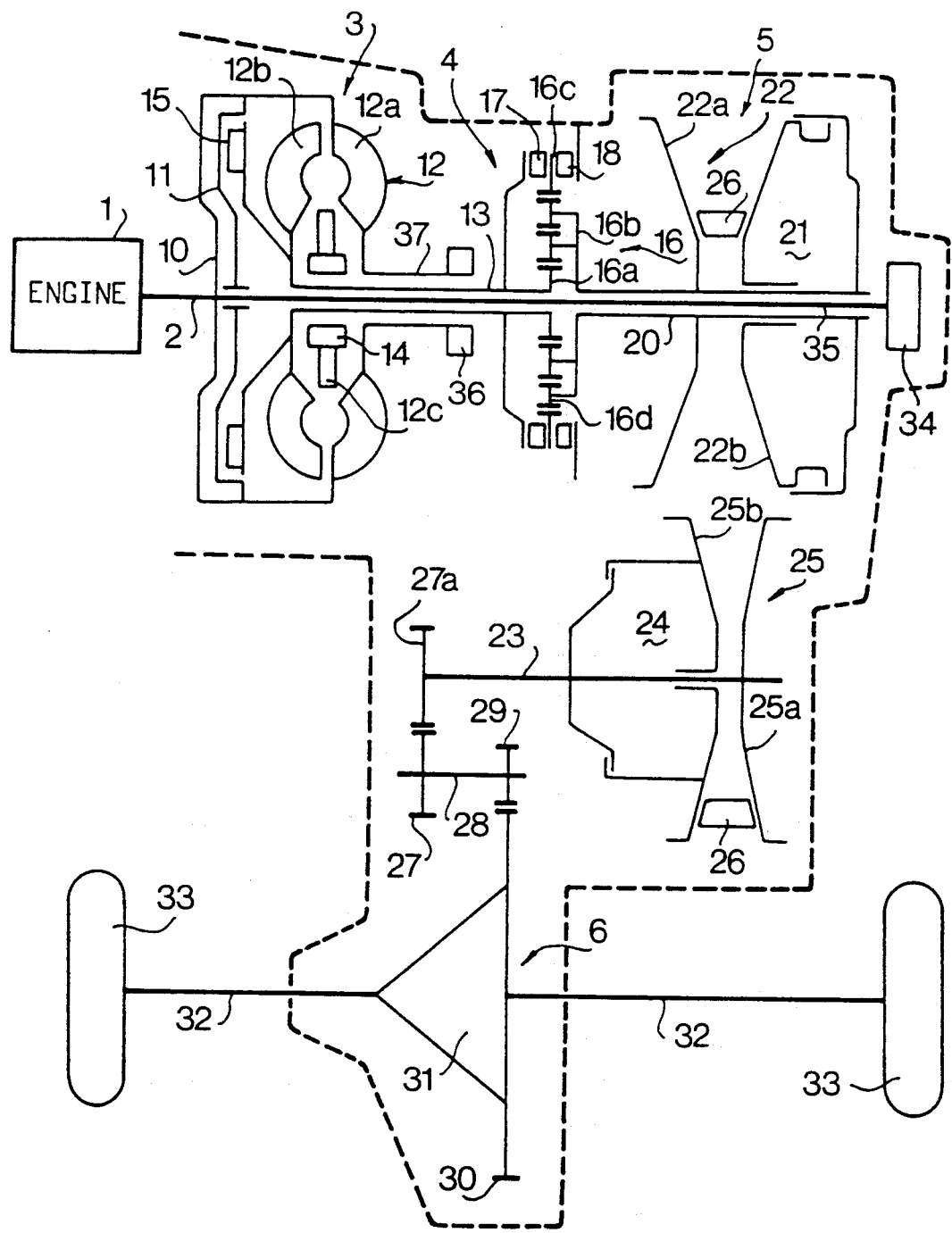
FIG. 1 shows a schematic diagram of a continuously variable belt-drive transmission to which the present invention is applied.

FIG. 1 shows a four-wheel drive power transmission system with a continuously variable belt-drive automatic transmission for a motor vehicle, to which the present invention is applied. An engine 1 is mounted on a motor vehicle at a front portion thereof. The power transmission system comprises a torque converter device 3, a selector device 4, a continuously variable belt-drive transmission 5 and a final reduction and differential device 6.

The torque converter device 3 has a torque converter 12 with a lockup clutch 15. A drive plate 10 is fixed to a crankshaft 2 of the engine 1. A converter cover 11 is secured to the drive plate 10. The torque converter 12 comprises an impeller 12a integral with the converter cover 11 by welding, a turbine 12b connected to an input shaft 13, and a stator 12c connected to a one-way clutch 14. The lockup clutch 15 is disposed between the converter cover 11 and the torque converter 12 for making a contact with the cover 11.

The selector device 4 comprises a planetary gear 16 having a pair of pinions 16d, and a sun gear 16a mounted on the input shaft 13. Pinions 16d are supported on a carrier 16b. The sun gear 16a is engaged with a ring gear 16c through pinions 16d. A forward clutch 17 is disposed between the sun gear 16a and the ring gear 16c. A reverse brake 18 is disposed between the ring gear 16c and a main case. At forward driving such as a drive range (D) selection, the forward clutch 17 is engaged to lock the sun gear 16a. At reverse driving, the reverse brake 18 is engaged to lock the ring gear 16c for reversely rotating the carrier 16b.

The belt-drive transmission 5 has a main shaft 20 engaged with the carrier 16b and an output shaft 23 provided in parallel with the main shaft 20. A drive pulley (primary pulley) 22 and a driven pulley (secondary pulley) 25 are mounted on the main shaft 20 and output shaft 23, respectively. A fixed conical disc 22a of the drive pulley 22 is integral with main shaft 20 and an axially movable conical disc 22b is axially slidably mounted on the main shaft 20. The movable conical disc 22b also slides in a cylinder 21 formed on the main shaft 20 to provide a servo device.

A fixed conical disc 25a of the driven pulley 25 is formed on the output shaft 23 opposite the movable conical disc 22b and a movable conical disc 25b is slidably mounted on the shaft 23 opposite the disc 22a. Movable conical disc 25b has a cylindrical portion which is slidably engaged in a cylinder 24 of the output shaft 23 to form a servo device. A drive belt 26 engages with the drive pulley 22 and the driven pulley 25. The cylinder 21 of the drive pulley 22 is so designed that the pressure receiving area thereof is larger than that of the cylinder 24 of the driven pulley 25. Thus, the running diameter of the belt 26 on the pulleys is varied dependent on driving conditions.

Secured to the output shaft 23 is a drive gear 27a of the final reduction device 6 which engages with an intermediate reduction gear 27 on an intermediate shaft 28. An intermediate gear 29 on the shaft 28 engages with a final reduction gear 30. The rotation of the final reduction gear 30 is transmitted to axles 32 of vehicle driving wheels 33 through a differential 31.

In the transmission 5, a main oil pump 34 is provided for supplying a high pressure of oil for the transmission. The main shaft 20 has an axial passage in which a main oil pump driving shaft 35 connected to the crankshaft 2 is rotatably mounted. An auxiliary oil pump 36 for the torque converter device 3 is housed therein. An auxiliary pump drive shaft 37 is connected to the impeller 12a and is operatively connected with the converter cover 11.

Figure 2:
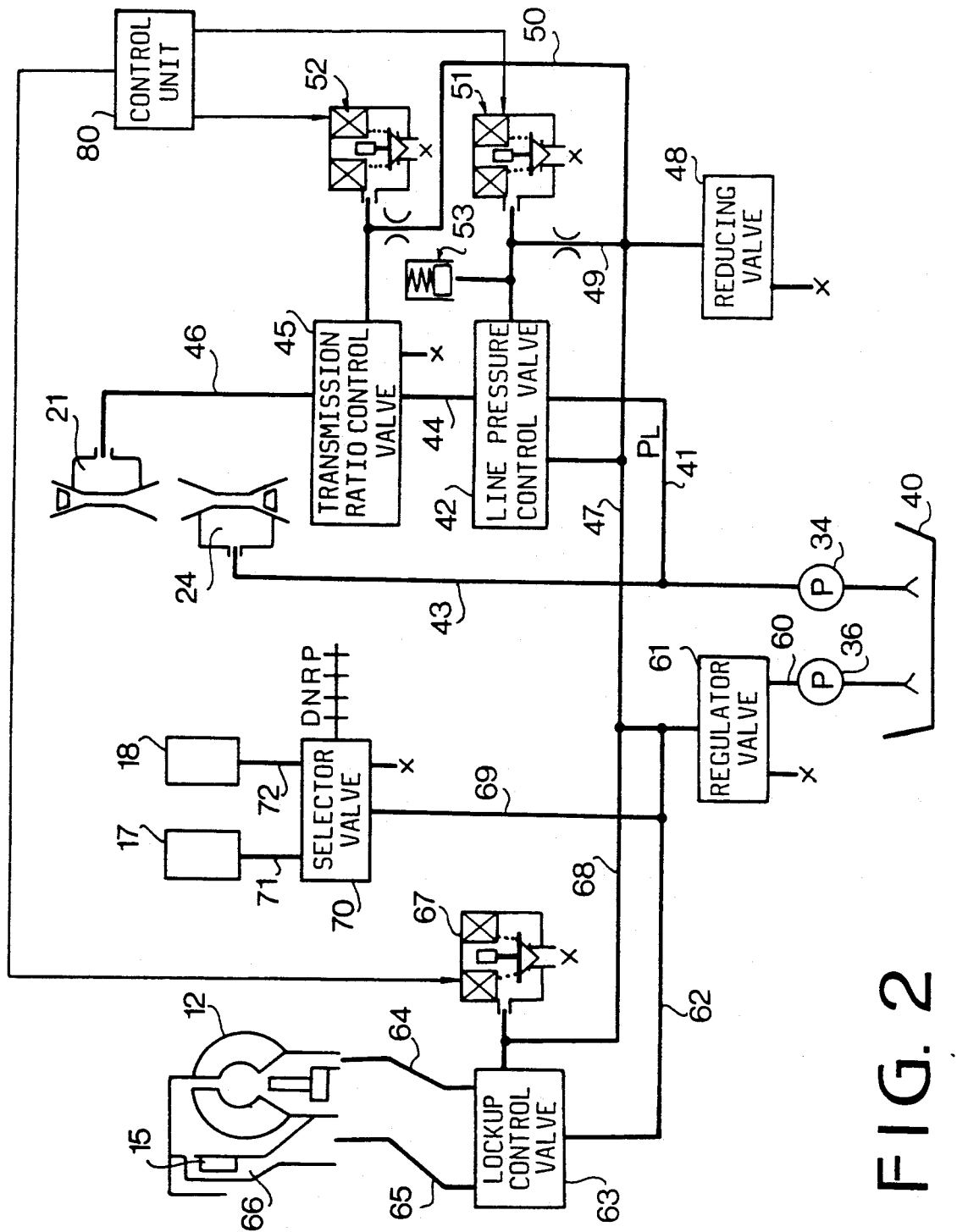
FIG. 2 shows a hydraulic control circuit for the transmission.

Referring to FIG. 2, showing a hydraulic control circuit, oil in an oil reservoir 40 is supplied to a line pressure control valve 42 through a line pressure passage 41 by the pump 34. An oil passage 43 connected to the passage 41 is communicated with the cylinder 24 of the driven pulley 25. The passage 41 is further communicated with a transmission ratio control valve 45 through a passage 44. The cylinder 21 of the drive pulley 22 is applied with pressurized oil through the passage 41, the line pressure control valve 42, the passage 44, the transmission ratio control valve 45, and a passage 46.

A passage 47 connected to the oil pump 36 is communicated with a reducing valve 48 for providing a constant reducing pressure of the oil. A conduit 49 is communicated with the line pressure control valve 42, with a solenoid operated on-off valve 51 and with an accumulator 53. A conduit 50 is communicated with the transmission ratio control valve 45 and with a solenoid operated on-off valve 52.

The solenoid operated valve 51 is adapted to be operated by duty signals from a control unit 80 for producing control pressure in the form of pulses. The pulsation of the control pressure is smoothed by the accumulator 53 and the control pressure is applied to the line pressure control valve 42, so that the line pressure $P_L$ is controlled in accordance with the transmission ratio i, engine torque Te, and a torque multiplication rate of the torque converter 12.

The solenoid operated valve 52 is also operated by duty signals and produces reducing pressure which is applied to the transmission ratio control valve 45 for shifting a spool of the valve 45 to an oil supply position and an oil drain position by a degree of a duty ratio. Thus, the flow rate of the oil supplied to or drained from the cylinder 21 of the drive pulley 22 is controlled to provide the optimum transmission ratio i.

A passage 60 from the oil pump 36 is communicated with a regulator valve 61 for producing a predetermined low oil pressure. The regulator valve 61 is communicated with the lockup control valve 63 through a passage 62. The lockup control valve 63 is communicated with the torque converter 12 through a passage 64 and a release side oil chamber 66 of the lockup clutch 15 through a passage 65. The lockup control valve 63 is communicated with the reducing valve 48 through passage 68 for supplying with the reducing pressure. The reducing pressure is also supplied to a solenoid operated valve 67. The solenoid operated valve 67 operates the lockup control valve 63 by duty signals from the control unit 80 to communicate the passage 62 with the passage 64 or the passage 65.

When the lockup signal is not generated, the lockup control valve 63 operates to communicate the passage 62 with the passage 65 for supplying the pressure of the oil to the torque converter 12 through the release side oil chamber 66. When the lockup signal is generated, the passage 62 is communicated with the passage 64 for pushing the lockup clutch 15 to the converter cover 11, which means locking the torque converter 12.

The passage 62 is further communicated with a selector valve 70 through a passage 69. The selector valve 70 is communicated with the forward clutch 17 through a passage 71 and with the reverse brake 18 through a passage 72. The selector valve 70 is provided for selectively connecting the passages in accordance with operations of a selector lever for selecting operational ranges such as a parking range (P), a reverse range (R), a neutral range (N), and a drive range (D). In the D range selection, the selector valve 70 operates to communicate the passage 69 with the passage 71 for supplying the pressure of the oil to the forward clutch 17. In the R range selection, the passage 69 is communicated with the passage 72 for supplying the pressure of the oil to the reverse brake 18. In the P, N ranges selections, the oil in the forward clutch 17 and the reverse brake 18 are drained.

Figure 3B:
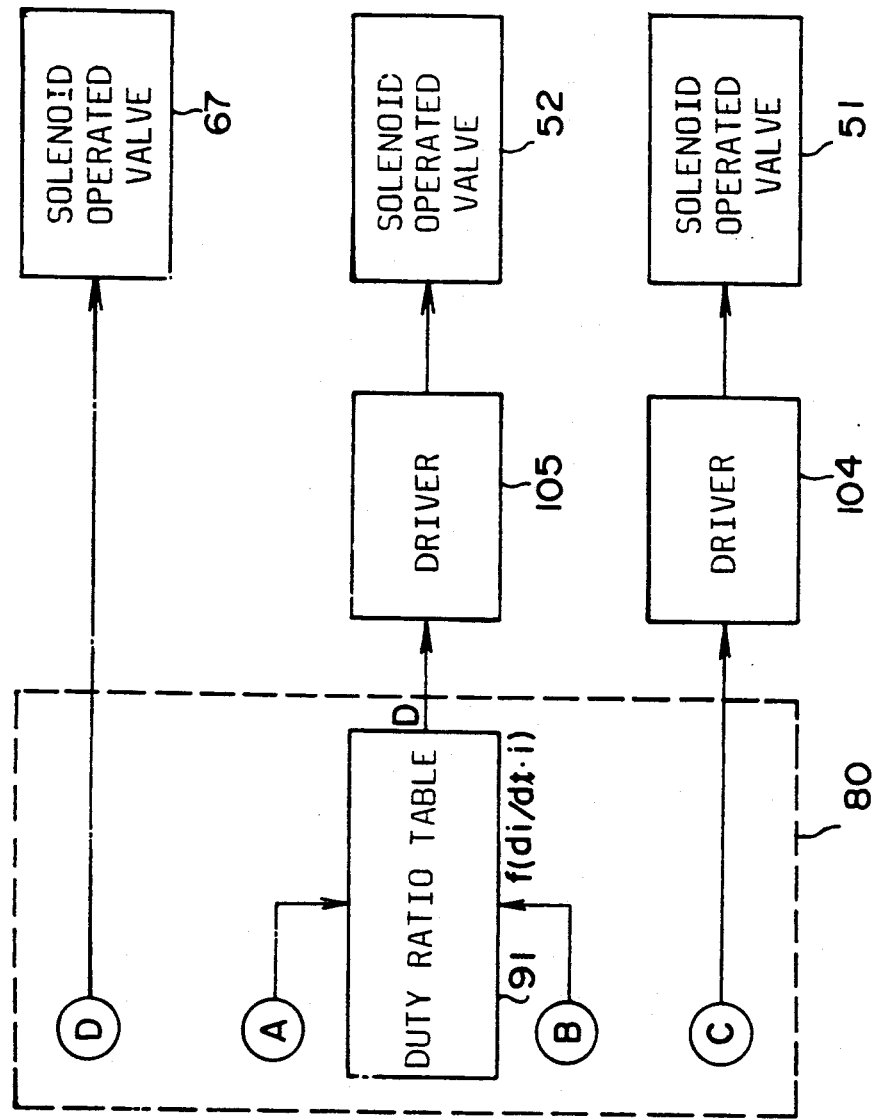

Referring to FIGS. 3a and 3b, the system is arranged to control the transmission ratio i, the lockup clutch 15 for the torque converter, and the line pressure $P_L$. In the system, an engine speed sensor 81, a drive pulley speed sensor 82, a driven pulley speed sensor 83, a throttle position sensor 84, and a shift position sensor 85 are provided.

Output signals $N_P$ and $N_S$ of the sensors 82, 83 are fed to an actual transmission ratio calculator 86 to produce an actual transmission ratio i in accordance with $i = N_P/N_S$. The actual transmission ratio i, output signal $\theta$ representing the opening degree of the throttle position sensor 84 and the output signal of the sensor 85 are fed to a desired drive pulley speed table 87 to derive a desired drive pulley speed Npd in accordance with values of the ratio i and the signal $\theta$. The desired drive pulley speed Npd and the output signal $N_S$ are fed to a desired transmission ratio calculator 88 to calculate a desired transmission ratio id in accordance with $id = Npd/N_S$.

The desired transmission ratio id is fed to a desired transmission ratio changing speed calculator 89 which produces a desired transmission ratio changing speed did/dt. The speed did/dt is the amount of change of the desired transmission ratio id during a predetermined time interval. The actual transmission ratio i, the desired transmission ratio id, the desired transmission ratio changing speed did/dt are applied to a transmission ratio changing speed calculator 90 to produce a transmission ratio changing speed di/dt from the formula as follows.

$$di/dt = K1(id-i) + K2 \cdot did/dt$$

Where K1, K2 are coefficients, id-i is a controlling amount dependent on the difference between the desired and actual transmission ratios, and did/dt is a correction factor for the delay in operation of the system.

The speed di/dt and actual ratio i are applied to a duty ratio table 91 to derive a duty ratio D in accordance with D=f (di/dt, i) using a table at upshift and downshift of the transmission. The duty ratio D is supplied to the solenoid operated on-off valve 52 through a driver 105.

Further, the throttle position signal $\theta$ and the engine speed signal Ne are fed to an engine torque calculator 97, so that engine torque Te is calculated based on throttle position $\theta$ and engine speed Ne. The engine speed Ne and the drive pulley speed Np are applied to a torque multiplication rate providing section 98. In the providing section 98, a speed ratio e of the torque converter 12 is calculated in accordance with $e = N_P/Ne$ when the transmitting torque is varied in accordance with the increase of the torque of the torque converter. A torque multiplication rate $\alpha$ is derived from a table in dependency on the speed ratio e. The engine torque Te and the torque multiplication rate $\alpha$ are applied to an input torque calculator 99, so that an input torque Ti is calculated by $Ti = Te \cdot \alpha$.

On the other hand, the actual transmission ratio i from the calculator 86 is applied to a necessary line pressure table 100 to derive a necessary line pressure $P_{LU}$ per unit torque The necessary line pressure $P_{LU}$ and the input torque Ti are applied to a desired line pressure calculator 101 where a desired line pressure $P_L$ is calculated by $P_L = P_{LU} \times Ti$.

In a hydraulic circuit of the control system, the oil pressure discharged from the pump and applied to the line pressure control valve 42 varies in accordance with the change of the engine speed Ne, so that a maximum line pressure $P_{LM}$ also varies. In order to detect the variance of the maximum line pressure $P_{LM}$, the control unit is provided with a maximum line pressure table 102 to which the engine speed Ne and the actual transmission ratio i are supplied. Therefore, the maximum line pressure $P_{LM}$ is obtained.

The desired line pressure $P_L$ and the maximum line pressure $P_{LM}$ are applied to a duty ratio table 103 to derive a duty ratio $D_L$ corresponding to the desired line pressure $P_L$ and the maximum line pressure $P_{LM}$. The duty cycle $D_L$ is supplied to driver 104 which operates the solenoid operated on-off valve 51 at the duty ratio.

Describing a system for controlling the lockup clutch 15, the control unit 80 has a torque converter output torque estimating calculator 92 and a lockup clutch torque estimating calculator 93. Both calculators 92 and 93 are applied with the engine speed signal Ne from the engine speed sensor 81, the drive pulley speed signal $N_P$ from the drive pulley speed sensor 82, the output signal $\theta$ of the throttle position sensor 84, and the actual transmission i. The torque converter output torque estimating calculator 92 calculates a torque converter output torque FT to be obtained if the torque converter 12 is operated at that time, or an actually produced torque when the torque converter 12 is operating, in accordance with parameters such as the engine torque Te calculated at the engine torque calculator 97, the torque multiplication rate $\alpha$ obtained at the torque multiplication rate providing section 98, efficiency of the torque converter 12, the actual transmission ratio i, force of inertia, the efficiency of the continuously variable transmission 5, and gear ratio between the intermediate gear 29 and the final reduction gear 30.

The lockup clutch torque calculator 93 calculates a lockup clutch torque FL to be obtained if the lockup clutch 15 is engaged, or an actual torque when the lockup clutch 15 is engaged in accordance with the above-mentioned factors except the parameters relative to the torque converter 12. The parameters such as efficiency and inertia force of the lockup clutch 15 are used instead.

The calculated torques FT and FL are fed to a selecting section 94 where the torques FT and FL are compared with each other. When the torque FT of the torque converter 12 is larger than the torque FL of the lockup clutch 15 (FT>FL) and when the vehicle stops, the release of the lockup clutch 15 is determined. Thus, a lockup-off signal is fed to the solenoid operated valve 67 through a driver 96, thereby rendering the torque converter 12 effective. To the contrary if the lockup clutch torque FL is larger than the torque converter torque FT (FT≦FL), a lockup-on signal is fed to the solenoid operated valve 67, so that the lockup clutch 15 is engaged.

The operations of the system will be described hereinafter.

When the P or N range is selected at starting, oil in the forward clutch 17 and the reverse brake 18 are drained. Thus, the planetary gear 16 is released to disengage the transmission 5. At the same time, oil pumps 34 and 36 are driven by the oil pump driving shaft 35 and the converter cover 11 to supply pressurized oil to the line pressure control valve 42, regulator valve 61 and reducing valve 48. The line pressure $P_L$ is applied only to the cylinder 24 of the driven pulley 25 so that the drive belt 26 engages with the driven pulley 25 at a maximum running diameter to provide the largest transmission ratio (low speed stage). In this state, where the vehicle is at a stop, the selecting section 94 applies a lockup-off signal to the driver 96 so that the solenoid operated valve 67 is operated to apply the pressurized oil to release side chamber 66 of the lockup clutch 15. The oil is further supplied to the torque converter 12 so as to operate it.

When the D range is selected, the actuating pressure is applied to the forward clutch 17 to lock the planetary gear 16, so that the input shaft 13 is engaged with the main shaft 20. Thus, the torque converter 12 operates to transmit the power of the engine to the automatic transmission 5. The power of the engine is transmitted to the output shaft 23 at the largest transmission ratio by the drive belt 26 and pulleys 22, 25 and further transmitted to axles 32 of the driving wheels 33 through the final reduction device 6. Thus, the vehicle is started.

At the start of the vehicle, torque converter 12 multiplies the output torque of the engine at a small speed ratio e. The torque multiplication rate $\alpha$ is derived from the table 98 so as to increase the desired line pressure $P_L$. Thus, the line pressure controlled by the line pressure control valve 42 is increased in accordance with the maximum transmission ratio and engine torque thereby transmitting the torque multiplied by the torque converter 12 without slipping of the belt 26.

At the start of the vehicle, the transmission ratio is at the largest transmission ratio, that is the transmission ratio i is kept at the maximum transmission ratio of 2.5. On the other hand, in the control unit 80, the actual transmission i, desired transmission ratio id and the desired transmission ratio changing speed did/dt are obtained at the actual transmission ratio calculator 86, desired transmission ratio calculator 88 and the desired transmission ratio changing speed calculator 89, respectively. The transmission ratio changing speed di/dt is calculated at the transmission ratio changing speed calculator 90 in accordance with the transmission ratio i, the desired transmission ratio id and the desired transmission ratio changing speed did/dt. The transmission ratio changing speed di/dt is fed to the duty ratio table 91 so that the duty ratio D for the solenoid operated valve 52 is obtained from the table 91. When the desired transmission ratio id becomes smaller than the maximum transmission ratio 2.5 (id<2.5), the solenoid operated valve 52 is operated to operate the transmission ratio control valve 45. Consequently, the cylinder 21 of the drive pulley 22 is applied with the oil pressure, thereby starting the change of the transmission from a point on a largest transmission ratio changing line.

Figure 4:
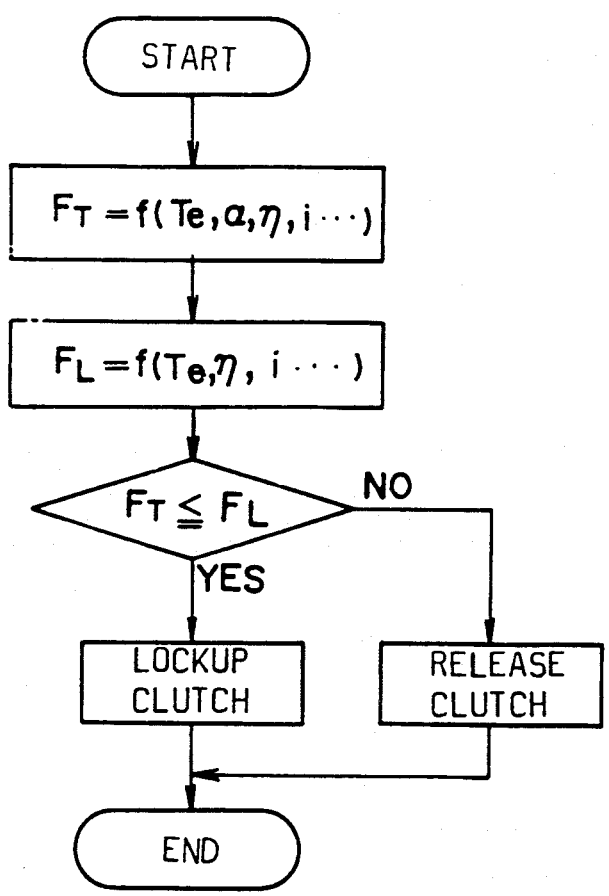
FIG. 4 is a flowchart showing the operation of the system of the present invention.

At the same time, the operation shown by the flowchart in FIG. 4 is carried out and the actual or estimated torque converter torque FT and the lockup clutch torque FL are calculated to determined whether to engage or release the lockup clutch 15. In a steady state after the start of the vehicle, the torque multiplication rate $\alpha$ decreases so that the torque converter torque FT becomes smaller than the lockup clutch torque FL (FT≦FL) Thus, the lockup of the clutch 15 is determined at the selecting section 94, thereby producing the lockup-on signal.

In order to engage the lockup clutch 15, the lockup control valve 63 is operated to drain the oil in the release side chamber 66 through the passage 65 so that the lockup clutch 15 is pushed by the oil pressure in the torque converter 12. Thus, the lockup clutch 15 comes in contact with the converter cover 11 to lock the crankshaft 2 and the lockup clutch 15, which means locking of the torque converter 12. Therefore, the engine power can be efficiently transmitted to the input shaft 13 through the lockup clutch 15.

When the accelerator pedal is depressed to accelerate the vehicle, or when the engine load increases, while the lockup clutch 15 is engaged, the estimated torque converter output torque FT increases due to the increase of the estimated torque multiplication rate $\alpha$. Thus, the estimated torque converter output torque FT becomes larger than the actual lockup clutch torque FL (FT>FL). As a result, the selecting section 94 determines to release the lockup clutch 15 so as to temporarily operate the torque converter 12. Thus, the system of the invention operates such that the lockup clutch 15 is engaged or released so as to provide a larger torque whichever actually operated.

The present invention may be modified to calculate the torque converter output torque and the lockup clutch torque in accordance with factors other than those mentioned above. In addition, the transmission ratio may be controlled in dependency on a desired engine speed.

From the foregoing it will be understood that the present invention provides a continuously variable transmission having a torque converter with a lockup clutch where either the torque converter or the lockup clutch is selected so as to effectively utilize the characteristics of the torque converter and the lockup clutch. Thus, the optimum torque is transmitted to the continuously variable transmission, thereby improving driving performance and reducing fuel consumption. The lockup clutch is controlled while the transmission ratio continuously changes so that a shock does not occur at the engagement of the clutch.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling a belt drive continuously variable transmission for transmitting power of an engine to wheels of a motor vehicle, said system having a hydraulic circuit including a transmission ratio control valve, and said transmission having a torque converter with a lockup clutch, the system comprising:

first detector means for detecting engine operating conditions;

second detector means for detecting conditions of said transmission;

said transmission ratio control valve being provided to be operated in accordance with operating conditions of said engine and said conditions of said transmission for controlling a transmission ratio;

a lockup control valve provided to be operated to engage said lockup clutch;

torque converter torque estimating means for estimating torque of said torque converter based on the engine operating conditions and the transmission conditions;

lockup clutch torque estimating means for estimating torque of said lockup clutch based on the engine operating conditions and the transmission conditions;

comparator means for comparing the estimated converter torque and the estimated clutch torque with each other and for determining larger torque; and actuating means for actuating said lockup control valve for disengaging the lockup clutch when the comparator means determines that the estimated converter torque is larger than the estimated lockup clutch torque.

2. The system according to claim 1, wherein said engine operating conditions include an engine speed and a throttle valve opening degree.

3. The system according to claim 1, wherein said transmission conditions include speed of a drive pulley and a transmission ratio.

* * * * *